United States Patent
Nozaka et al.

(10) Patent No.: US 10,405,615 B2
(45) Date of Patent: Sep. 10, 2019

(54) SYSTEMS AND METHODS FOR JOINING HOOK FASTENER STRUCTURES

(71) Applicant: YKK Corporation, Tokyo (JP)

(72) Inventors: Kazuhiro Nozaka, Macon, GA (US); Yoshifumi Nakata, Marietta, GA (US); Chieko Dokyu, Toyama (JP); John Rene Hawkins, III, Macon, GA (US); Howard Joseph Pfeuffer, Warner Robbins, GA (US); Eric Tham Rice, Warner Robbins, GA (US)

(73) Assignee: YKK Corporation (JP)

(*) Notice: Subject to any disclaimer, the term of this patent is extended or adjusted under 35 U.S.C. 154(b) by 0 days.

(21) Appl. No.: 15/663,307

(22) Filed: Jul. 28, 2017

(65) Prior Publication Data

US 2017/0325553 A1    Nov. 16, 2017

Related U.S. Application Data

(62) Division of application No. 14/263,580, filed on Apr. 28, 2014, now Pat. No. 9,750,311.

(51) Int. Cl.
*A44B 18/00* (2006.01)
*B29C 65/08* (2006.01)
(Continued)

(52) U.S. Cl.
CPC ...... *A44B 18/0073* (2013.01); *A44B 18/0015* (2013.01); *A44B 18/0061* (2013.01);
(Continued)

(58) Field of Classification Search
CPC combination set(s) only.
See application file for complete search history.

(56) References Cited

U.S. PATENT DOCUMENTS 3,500,509 A * 3/1970 Moden ............... A41F 1/02
                                                156/253
3,650,647 A * 3/1972 Jacobs ............. A41H 37/10
                                                24/114.6
(Continued)

FOREIGN PATENT DOCUMENTS

EP    0222562 A2 *  5/1987  ............ B29C 65/08
EP    0222562 B1    4/1992
(Continued)

OTHER PUBLICATIONS

Office Action, Chinese Patent Application No. 201510209647, dated Sep. 5, 2016.
(Continued)

*Primary Examiner* — Jason W San
(74) *Attorney, Agent, or Firm* — Kilpatrick Townsend & Stockton LLP

(57) ABSTRACT

Systems and methods for joining two or more pieces of hook fastener tape. In some embodiments, the two or more pieces of tape are spliced together using ultrasonic welding. At least one of the splicing components used to splice the tapes together may be configured so that the component influences the profile of a connecting portion along which the two tapes are welded together. In some cases, at least one of the splicing components may be configured to minimize deformation of the tapes as they are welded together.

10 Claims, 22 Drawing Sheets

(51) Int. Cl.
*B29C 65/78* (2006.01)
*B29C 65/00* (2006.01)
*B29L 31/00* (2006.01)

(52) U.S. Cl.
CPC .......... *B29C 65/08* (2013.01); *B29C 65/7841* (2013.01); *B29C 66/1122* (2013.01); *B29C 66/43* (2013.01); *B29C 66/81427* (2013.01); *B29C 66/81431* (2013.01); *B29C 66/81463* (2013.01); *B29C 66/83221* (2013.01); *B29C 66/8432* (2013.01); *B29C 66/8167* (2013.01); *B29L 2031/729* (2013.01)

(56) References Cited

U.S. PATENT DOCUMENTS

| | | | | |
|---|---|---|---|---|
| 3,982,988 | A * | 9/1976 | Heimberger | A44B 19/40 156/219 |
| 4,735,753 | A * | 4/1988 | Ackermann | A41H 37/04 156/580.1 |
| 5,685,050 | A * | 11/1997 | Murasaki | A44B 18/0061 24/442 |
| 5,715,581 | A * | 2/1998 | Akeno | A44B 18/0061 24/442 |
| 6,827,893 | B2 * | 12/2004 | Clune | A44B 18/0049 24/442 |
| 8,419,415 | B2 | 4/2013 | Sho et al. | |
| 8,898,869 | B2 * | 12/2014 | Idrizovic | A44B 18/0061 24/449 |
| 2002/0022108 | A1 * | 2/2002 | Krantz | A44B 18/0049 428/100 |
| 2005/0079321 | A1 * | 4/2005 | Tuman | A44B 18/0015 428/100 |
| 2005/0235462 | A1 * | 10/2005 | Takahashi | A41F 1/00 24/114.05 |
| 2006/0110562 | A1 * | 5/2006 | Roberts | A44B 18/0073 428/40.1 |
| 2008/0201919 | A1 * | 8/2008 | Horn | A61F 13/62 24/442 |
| 2010/0257704 | A1 * | 10/2010 | Tuma | A44B 18/0003 24/449 |
| 2012/0011685 | A1 * | 1/2012 | Rocha | A44B 18/0073 24/449 |
| 2013/0149490 | A1 * | 6/2013 | Cina | B32B 3/30 428/100 |
| 2014/0109356 | A1 * | 4/2014 | Fennell | H02G 3/32 24/449 |
| 2014/0130311 | A1 * | 5/2014 | Okuda | A44B 18/0049 24/449 |
| 2014/0137377 | A1 * | 5/2014 | Cheng | B29C 43/46 24/449 |
| 2014/0182093 | A1 * | 7/2014 | Cheng | A44B 18/008 24/449 |
| 2014/0298628 | A1 * | 10/2014 | Minato | A44B 18/0049 24/449 |
| 2015/0164186 | A1 * | 6/2015 | Cina | A44B 18/0076 24/449 |
| 2015/0201716 | A1 * | 7/2015 | Septien Rojas | B65D 33/2541 24/449 |
| 2015/0240863 | A1 * | 8/2015 | Chung | F16B 47/00 29/446 |
| 2015/0272284 | A1 * | 10/2015 | Rocha | A44B 18/0073 24/446 |

FOREIGN PATENT DOCUMENTS

| | | | | |
|---|---|---|---|---|
| EP | 0985362 | A1 * | 3/2000 | ......... A44B 18/0046 |
| EP | 0985362 | A1 | 3/2000 | |
| JP | S59160404 | | 9/1984 | |
| JP | 62-75919 | U | 5/1987 | |
| JP | S62186802 | | 8/1987 | |

OTHER PUBLICATIONS

Office Action, Korean Patent Application No. 10-2015-0059115, dated Oct. 4, 2016.
Restriction Requirement, U.S. Appl. No. 14/263,580, dated Jul. 2, 2015.
Non-Final Office Action, U.S. dated No. 14/263,580, dated Dec. 4, 2015.
Final Office Action, U.S. Appl. No. 14/263,580, dated Jun. 17, 2016.
Notice of Allowance, U.S. Appl. No. 14/263,580, dated Oct. 14, 2016.
Non-Final Office Action, U.S. Appl. No. 14/263,580, dated Feb. 10, 2017.
Notice of Allowance, U.S. Appl. No. 14/263,580, dated Jun. 13, 2017.

* cited by examiner

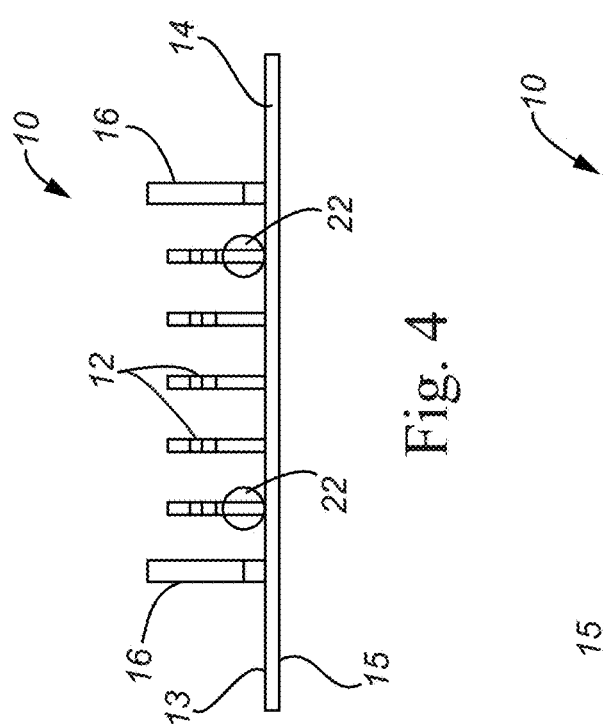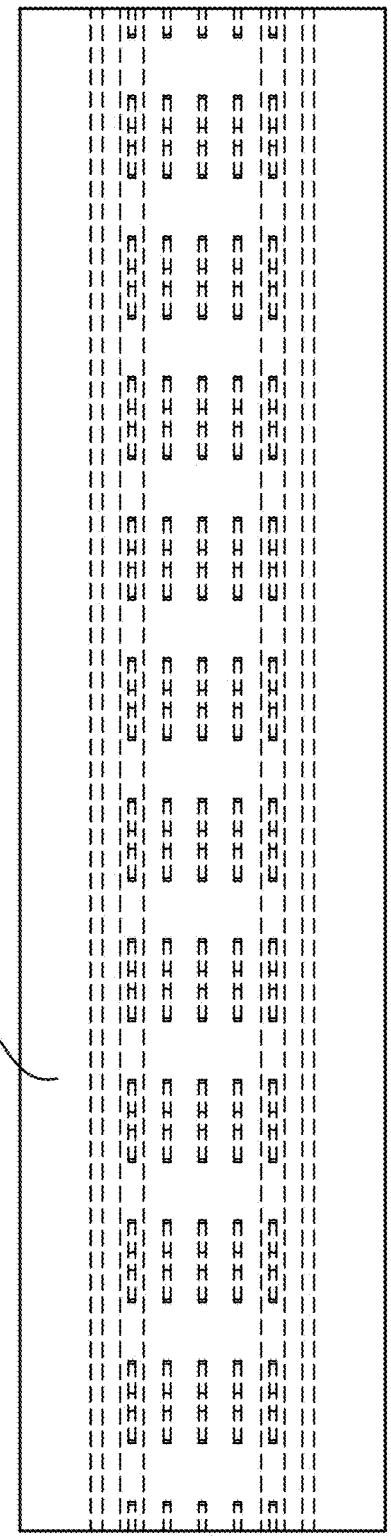

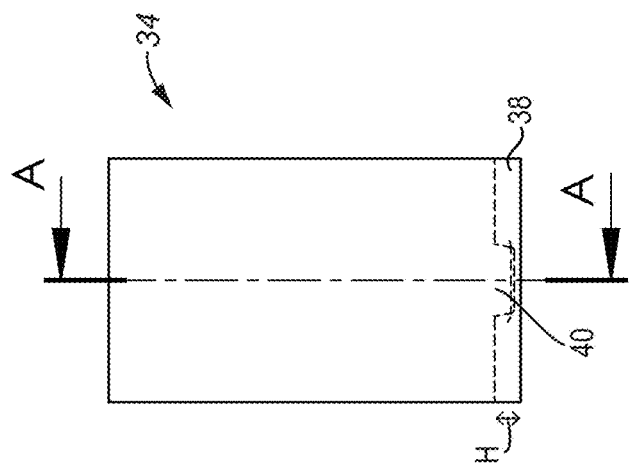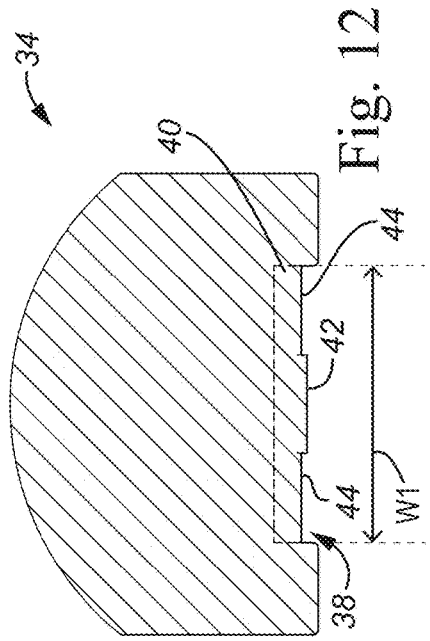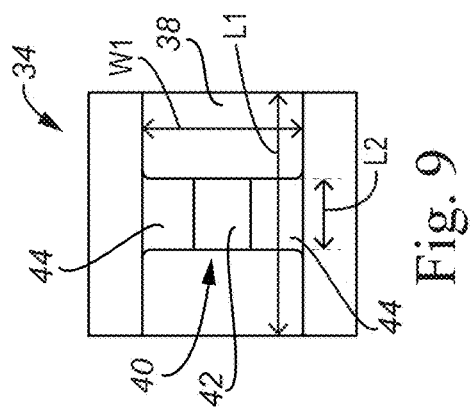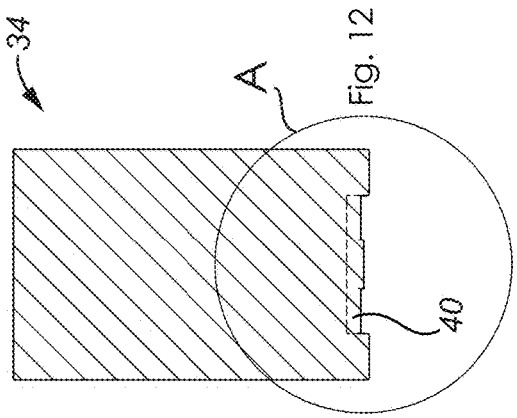

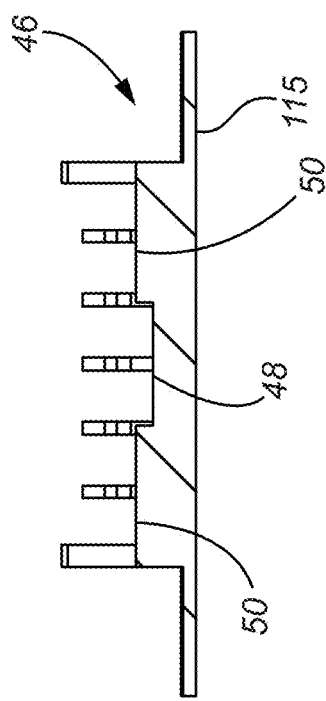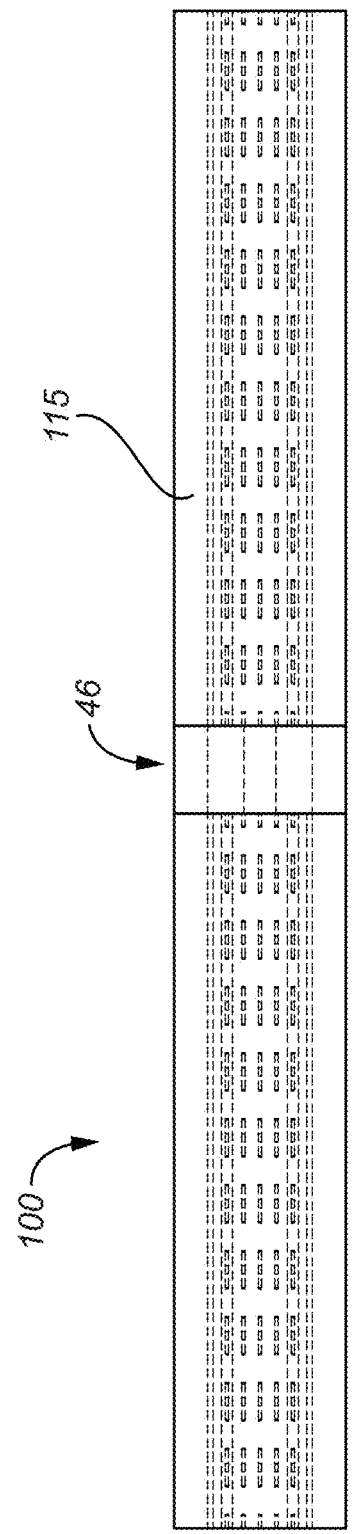

SYSTEMS AND METHODS FOR JOINING HOOK FASTENER STRUCTURES

CROSS REFERENCE TO RELATED APPLICATION

This application is a divisional application of U.S. application Ser. No. 14/263,580, filed Apr. 28, 2014, entitled "Systems and Methods for Joining Hook Fastener Structures," which is incorporated herein by reference in its entirety.

FIELD OF THE INVENTION

This application generally relates to hook fastener structures and, more particularly, to systems and methods for joining same.

BACKGROUND

Hook and loop fastener structures are used in various applications to secure objects together. Hook fastener structures typically include a plurality of hooks that engage with engaging material such as a plurality of loop elements. Hook fastener structures, such as hook fastener tape, may be provided as precut strips or on rolls as disclosed in U.S. Pat. No. 8,419,415, which issued on Apr. 16, 2013 and the contents of which are incorporated herein by reference. It may be desirable to join two or more pieces of the hook fastener tape together for various reasons.

Traditionally, staples, a separate piece of material, or other mechanical fastening mechanisms have been used to join two or more pieces of hook fastener tape together along a connecting portion of the joined tapes. However, as the connecting portion with the staple or other mechanical fastening mechanism often needs to be discarded, using a staple or other fastening mechanism generates waste. Moreover, a staple or other mechanical fastening mechanism introduces extra material and an extra process step, thus increasing costs.

In addition, in automotive seat cover installation and other applications, it is customary to introduce plastic foam material into a mold containing hook fastener tape such that the plastic foam material can surround the hook fastener tape when the foam is flowing and before it sets. Joining two tapes together with a staple or other mechanical fastening mechanism results in a gap between the tapes and the mold with which the tapes are used. This gap increases the likelihood that foam intrudes into the tape, which is undesirable.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

This patent discloses systems and methods for joining two or more pieces of hook fastener tape. In some embodiments, the tapes are spliced together by ultrasonic welding. At least one of the splicing components used to splice the tapes together may be configured so that the component influences the profile of the connecting portion along which the two tapes are joined. Specifically, at least one of the splicing components may be configured to shape/profile the connecting portion of the tapes to minimize deformation of the tapes and, in turn, minimize the possibility of foam intrusion into the welded tape.

BRIEF DESCRIPTION OF THE DRAWINGS

Illustrative embodiments of the present invention are described in detail below with reference to the following drawing figures:

FIG. 4 is an end view of the strip of hook fastener tape of FIG. 1.

FIG. 5 is a bottom view of the strip of hook fastener tape of FIG. 1.

FIG. 9 is a bottom view of the splicing component of FIG. 7.

FIG. 10 is a side view of the splicing component of FIG. 7.

FIG. 11 is a cross-sectional view of the splicing component of FIG. 7, taken along line A-A of FIG. 10.

FIG. 12 is an enlarged view of the splicing component of FIG. 7, taken at inset circle A of FIG. 11.

FIG. 22 is a cross-sectional view of the two welded strips of FIG. 19, taken along line C-C.

FIG. 23 is a bottom view of the two welded strips of FIG. 19.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
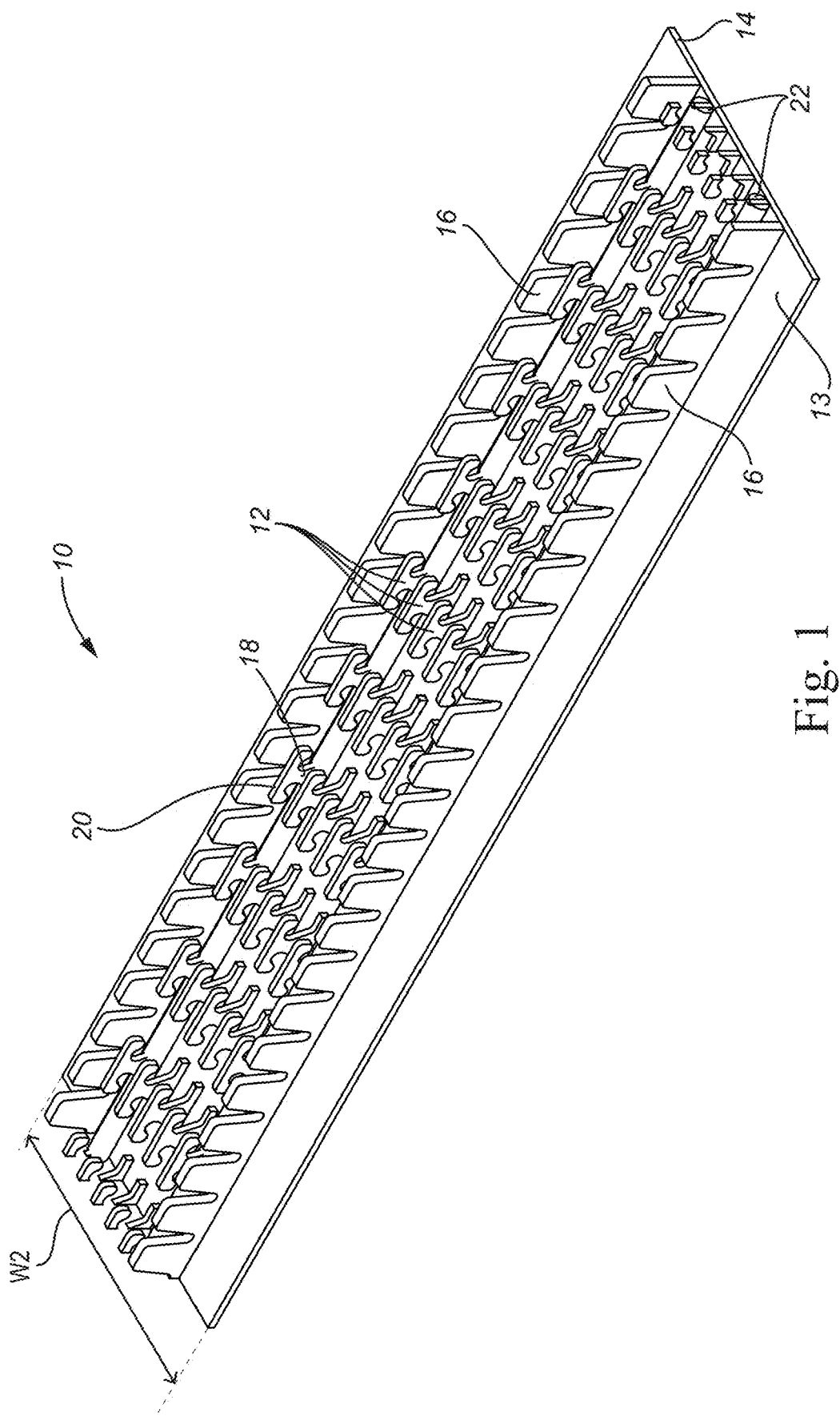
FIG. 1 is a top perspective view of a strip of hook fastener tape.
Figure 2:
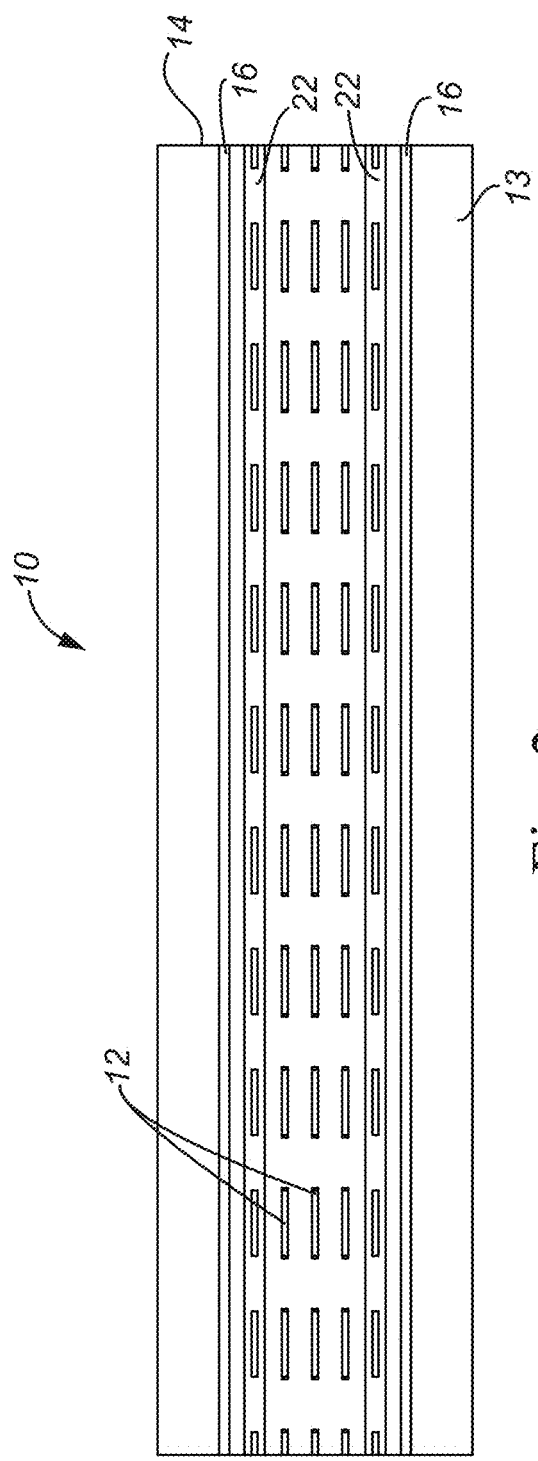
FIG. 2 is a top view of the strip of hook fastener tape of FIG. 1.
Figure 3:
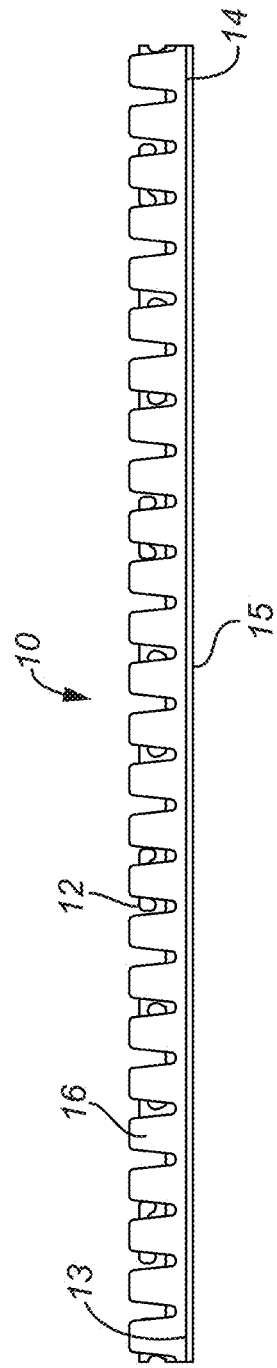
FIG. 3 is a side view of the strip of hook fastener tape of FIG. 1.

FIGS. 1-5 illustrate a portion of hook fastener tape 10. Hook fastener tape may be precut into strips of any desired length or may be provided on a roll that is subsequently cut to a desired length. Hook fastener tape 10 includes a top side 13 (FIG. 1) and a bottom side 15 (FIG. 5), as well as a plurality of hooks 12 that extend from a base 14 of the tape 10. Hooks 12 may be longitudinally and laterally spaced apart from one another and may be arranged in rows, as illustrated in FIG. 1. Hooks 12 may include a stem 18 and a top portion 20.

In some embodiments, walls 16 extend from the base 14 along the sides of the hook fastener tape 10. Hook fastener tape 10 may also include one or more longitudinal members 22 that extend longitudinally across the structure and that have strength and/or magnetic properties. As shown in FIG. 5, the bottom side 15 of the base 14 may in some embodiments have slight impressions from the formation of the hooks 12 and walls 16, but otherwise be generally flat.

Disclosed herein are improved systems and methods for joining pieces of hook fastener tape, such as hook fastener tape 10, together. Specifically, ultrasonic welding can be used to join together pieces of hook fastener tape. At a high level, ultrasonic welding uses ultrasound, which is sound at a high frequency, to cause rapid vibrations within the tapes to be joined. The rapid vibrations raise the temperature of the tapes and cause the tapes to melt and splice together.

Figure 6:
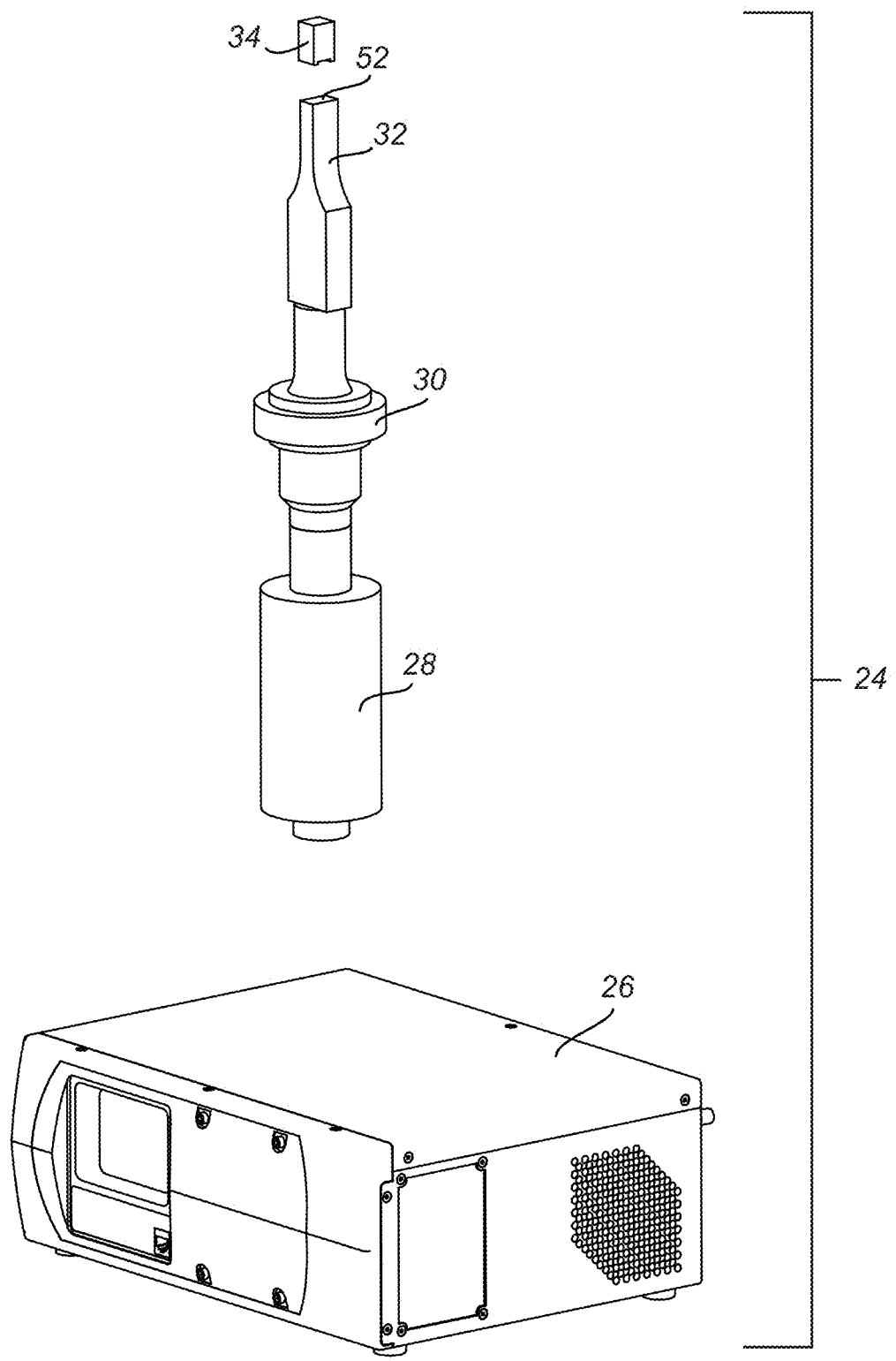
FIG. 6 is a schematic of a joining system for splicing strips of hook fastener tape.

A non-limiting example of an ultrasonic joining system 24 according to one embodiment is illustrated in FIG. 6. Joining system 24 includes a power supply/controller 26 that generates an electrical signal that is converted into a mechanical signal by converter 28. Joining system 24 may include an amplifier 30 that increases the power of the signal. Joining system 24 also includes a first splicing component 32 that vibrates due to the mechanical signal relative to a second splicing component 34.

As shown in FIGS. 13-18, the hook fastener tapes to be joined together are positioned between the first splicing component 32 and the second splicing component 34 as the first splicing component 32 vibrates relative to the second splicing component 34. More particularly, the tapes 10a, 10b to be joined are overlaid with one another along an overlay section 36 of the tapes (FIG. 13) such that ends of each tape 10a, 10b overlap. Overlay section 36 may be any suitable length L3 such as but not limited to between approximately 1 mm-10 mm. In some cases, it may be desirable to minimize the length of the overlay section 36. The tapes 10a, 10b are positioned relative to the joining system 24 such that the top side 13 of each of the tapes 10a, 10b faces the second splicing component 34 while the bottom side 15 of each of the tapes 10a, 10b faces the first splicing component 32.

FIGS. 7-11 illustrate various views of one non-limiting embodiment of second splicing component 34. In some embodiments, second splicing component 34 remains stationary while first splicing component 32 vibrates, although both first splicing component 32 and second splicing component 34 may vibrate. In some embodiments, the second splicing component 34 and the first splicing component 32 are swapped so that the mechanical signal causes the second splicing component 34 to vibrate while first splicing component 32 remains stationary. In this arrangement, the tapes 10a, 10b are positioned so that the top side 13 of each of the tapes 10a, 10b faces the second splicing component 34 while the bottom side 15 of each of the tapes 10a, 10b faces the first splicing component 32.

Figure 7:
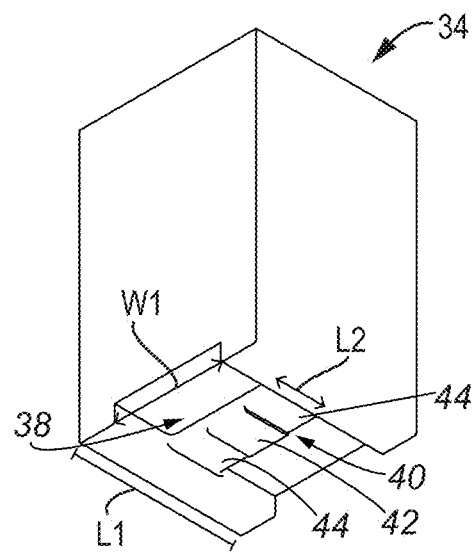
FIG. 7 is a bottom perspective view of a splicing component according to one embodiment.
Figure 8:
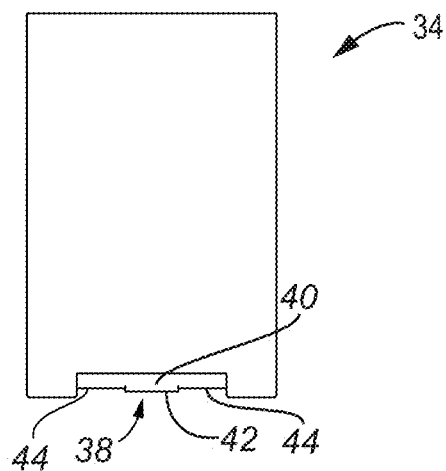
FIG. 8 is a front view of the splicing component of FIG. 7.

As shown in FIGS. 7-12, an end of the second splicing component 34 includes a tape receiving channel 38 that receives the overlaid tapes 10. As shown in FIGS. 7 and 9, tape receiving channel 38 has a width W1 and a length L1. In some cases, the width W1 of the tape receiving channel 38 corresponds to a width W2 (FIG. 1) of the tapes 10 to be received within the tape receiving channel 38. The length L1 of the tape receiving channel 38 can vary as desired. In some cases, a height H (FIG. 10) of the tape receiving channel 38 corresponds to the height of the tape (i.e., from the top surface 13 of the tape to the top of the top portion 20 of the hooks 12).

Figure 13:
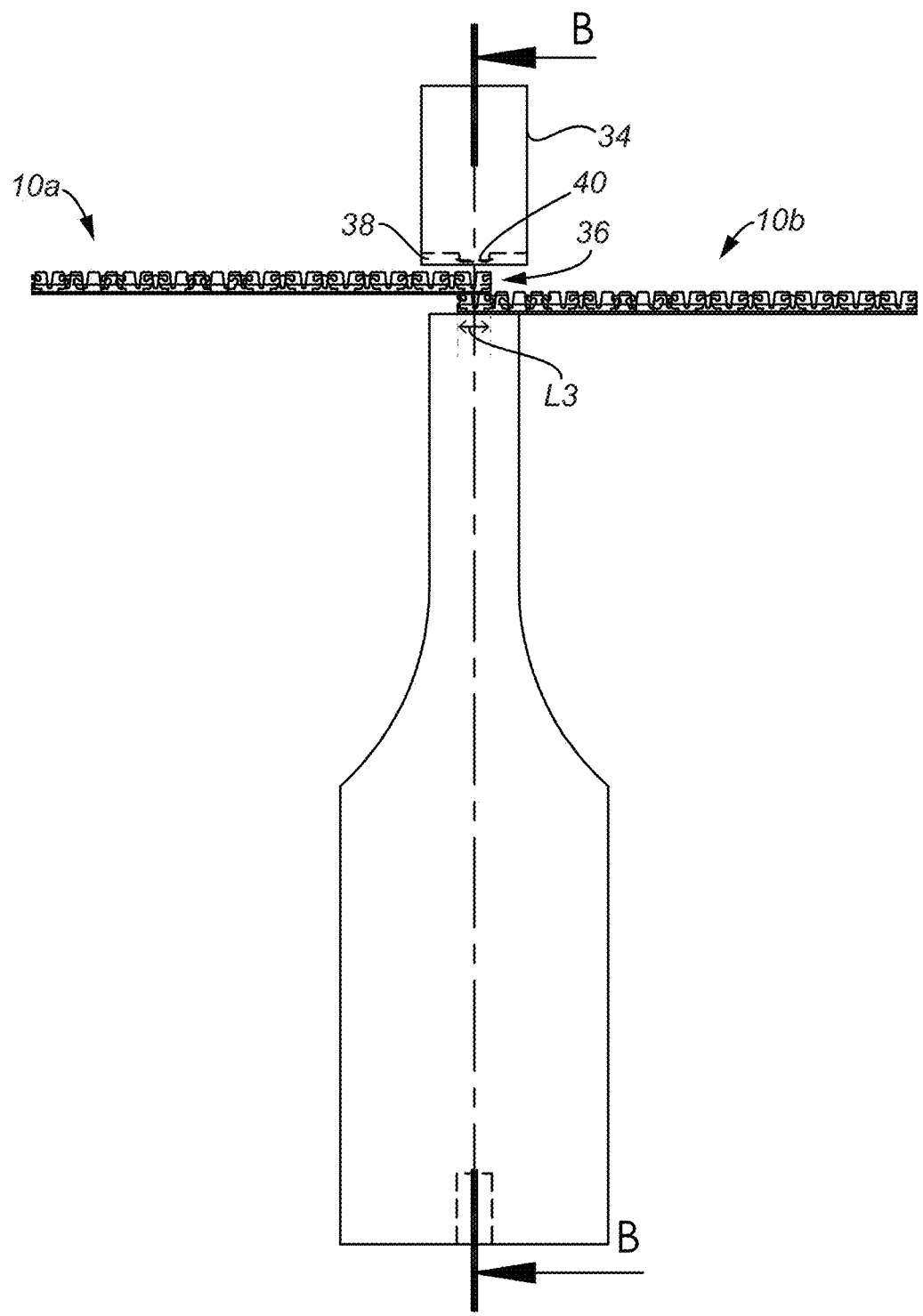
FIG. 13 is a side view of two strips of hook fastener tape positioned between a first splicing component and a second splicing component according to one embodiment.
Figure 14:
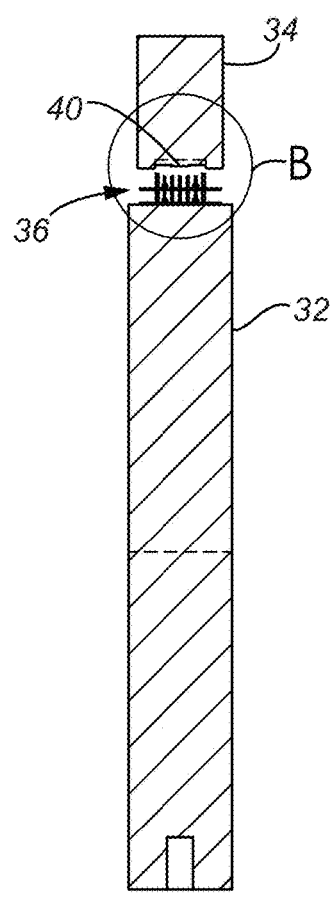
FIG. 14 is a cross-sectional view of FIG. 13, taken along line B-B.
Figure 15:
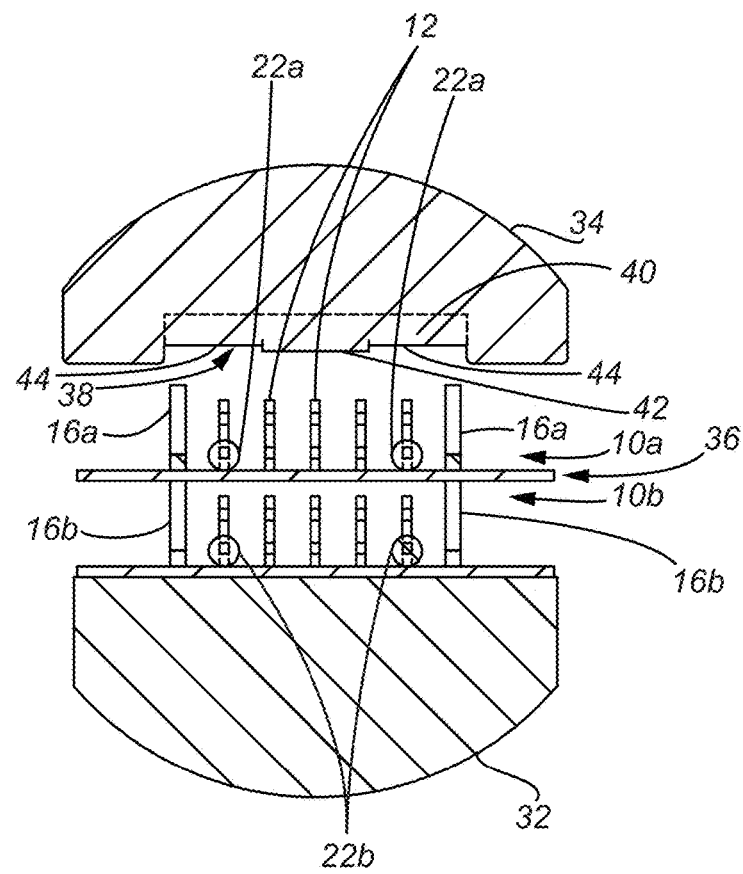
FIG. 15 is an enlarged view of FIG. 14, taken at inset circle B.
Figure 16:
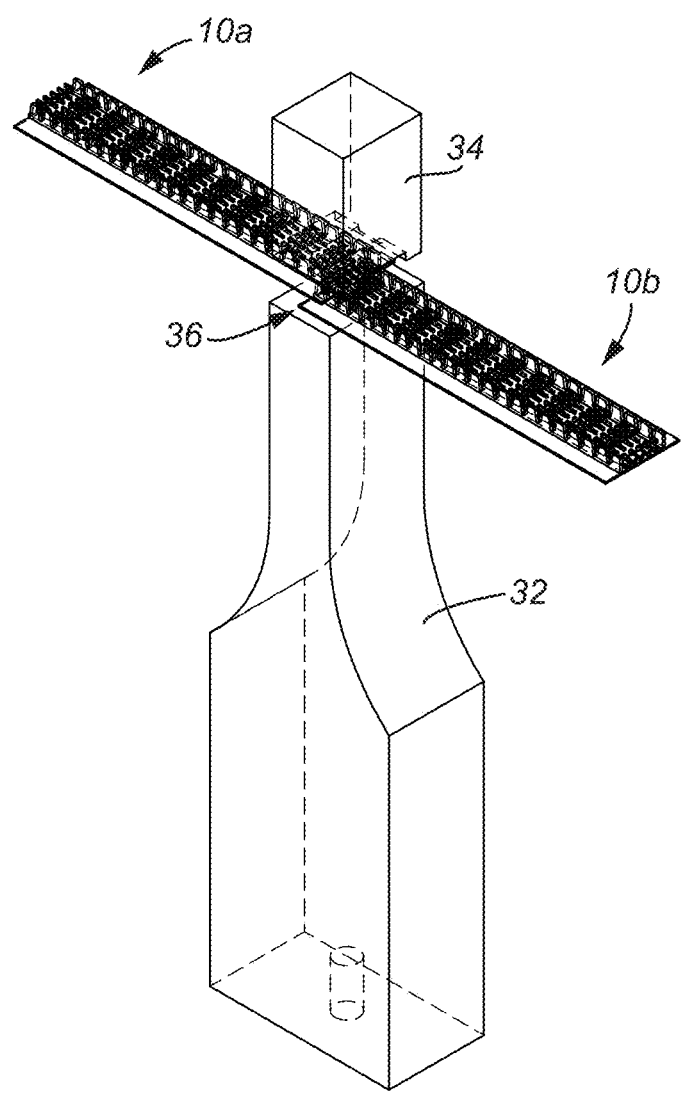
FIG. 16 is a side perspective view of FIG. 13.
Figure 17:
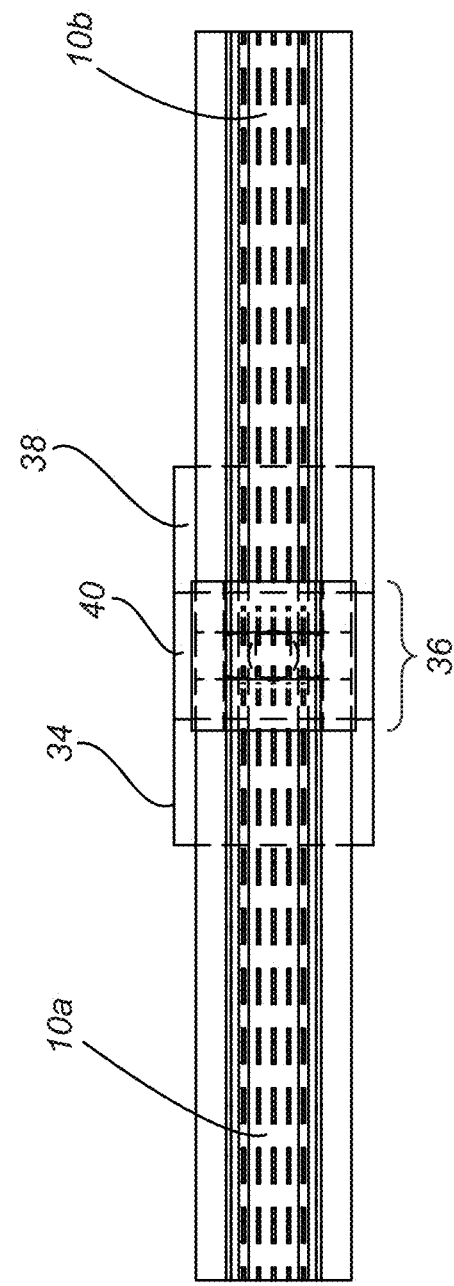
FIG. 17 is a bottom view of two strips of hook fastener tape positioned with respect to the second splicing component of FIG. 7.

The tape receiving channel 38 includes an extended portion 40 (FIGS. 7, 9-11) that generally extends across the width W1 of the tape receiving channel 38 and thus corresponds to the width W2 of the tapes 10a, 10b to be received within the tape receiving channel 38. The extended portion 40 includes a center section 42 that projects beyond the two side sections 44 of the extended portion 40, the center section 42 being sandwiched between the two side sections 44. Although the center section 42 is illustrated as having a rectangular shape, other shapes may be used, including those with curved edges. As shown in FIGS. 14-15 and 17, the overlay section 36 of the two tapes 10a, 10b can be positioned within the tape receiving channel 38 so that the extended portion 40 engages the overlay section 36. In some cases, the length L2 (FIG. 9) of the extended portion 40 generally corresponds to the length L3 of the overlay section 36 of the two tapes (FIG. 13).

In some cases, as shown in FIG. 15, the extended portion 40 is dimensioned so that, when the tapes 10a, 10b are properly positioned within the tape receiving channel 38, the side sections 44 of the extended portion 40 align generally with the walls 16a, 16b and/or the longitudinal members 22a, 22b of the tapes 10a, 10b while the center section 42 of the extended portion 40 aligns generally with at least some of the hooks 12 of the tapes 10a, 10b. In this way, the extended portion 40 is configured to accommodate the various elements of the tapes 10a, 10b (i.e., the walls 16a and 16b, the hooks 12, and the longitudinal members 22a, 22b) and help minimize the impact of the oscillation of the first splicing component 32. Minimizing the impact of the oscillation on the tapes 10a, 10b helps minimize any deformations of the tapes 10a, 10b. Minimizing the deformations of the tapes in turn helps reduce gaps that would otherwise be created between the tape and the mold with which the tape is placed, and, as such, reduces the likelihood that foam will intrude into the welded tape.

Figure 18:
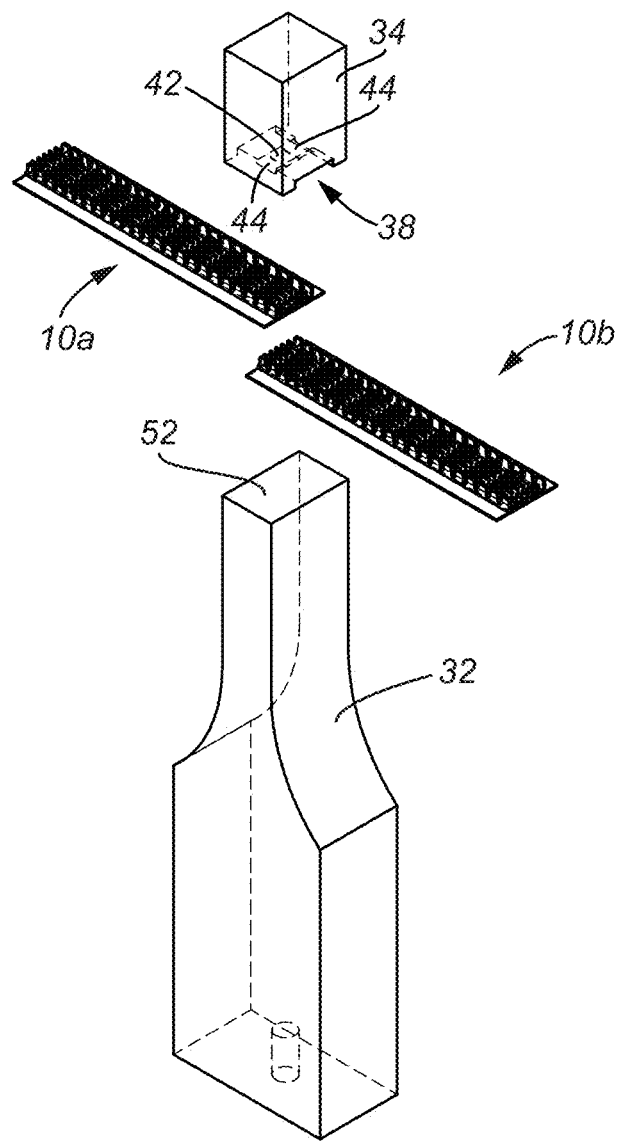
FIG. 18 is an exploded view of two strips of hook fastener tape positioned between a first splicing component and a second splicing component.

In some embodiments, an end of the first splicing component 32 has a generally flat surface 52 (FIGS. 6 and 18). In this way, the surface 52 can conform to the generally flat bottom side 15 of the tapes 10a, 10b.

Figure 19:
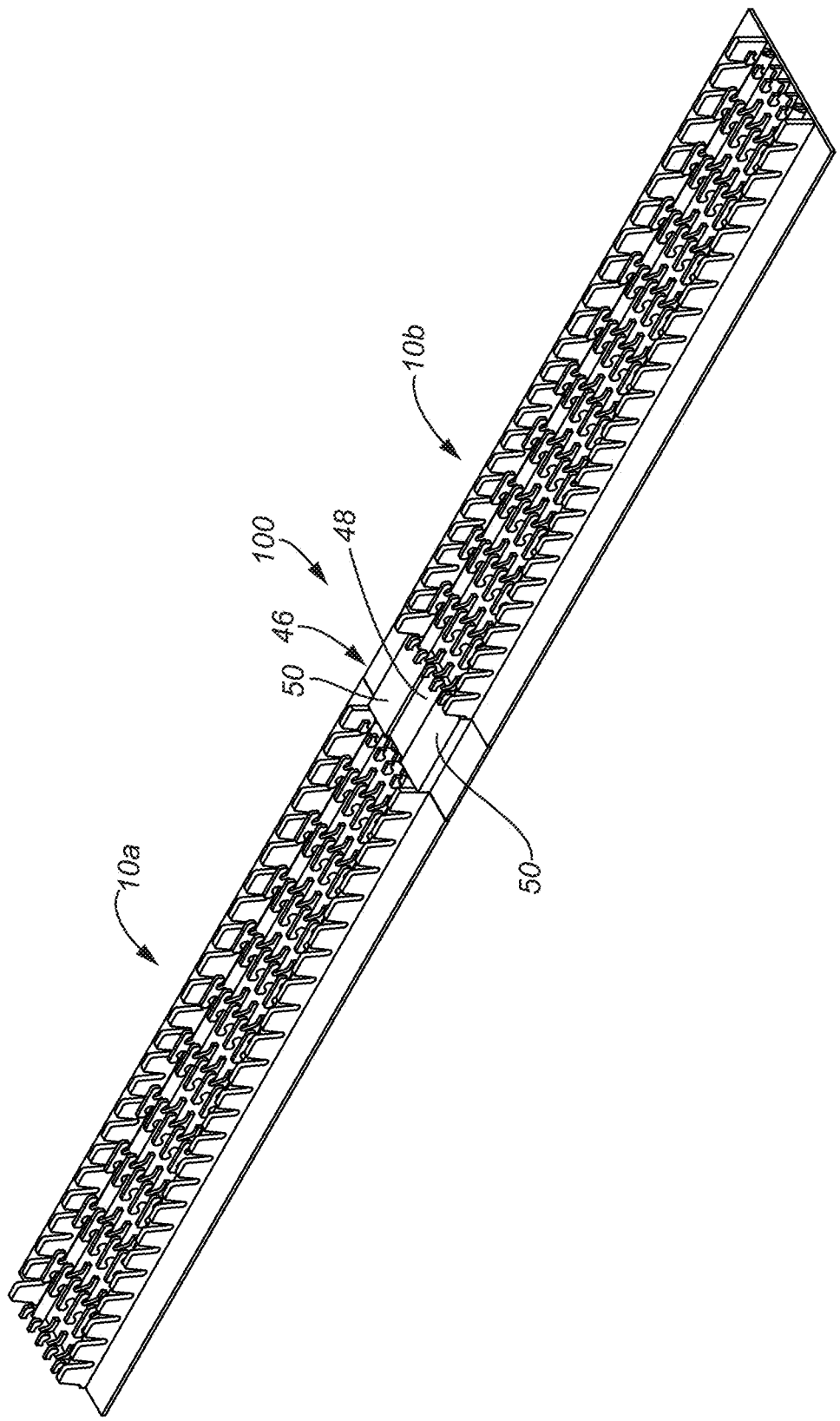
FIG. 19 is a top perspective view of two welded strips of hook fastener tape.
Figure 20:
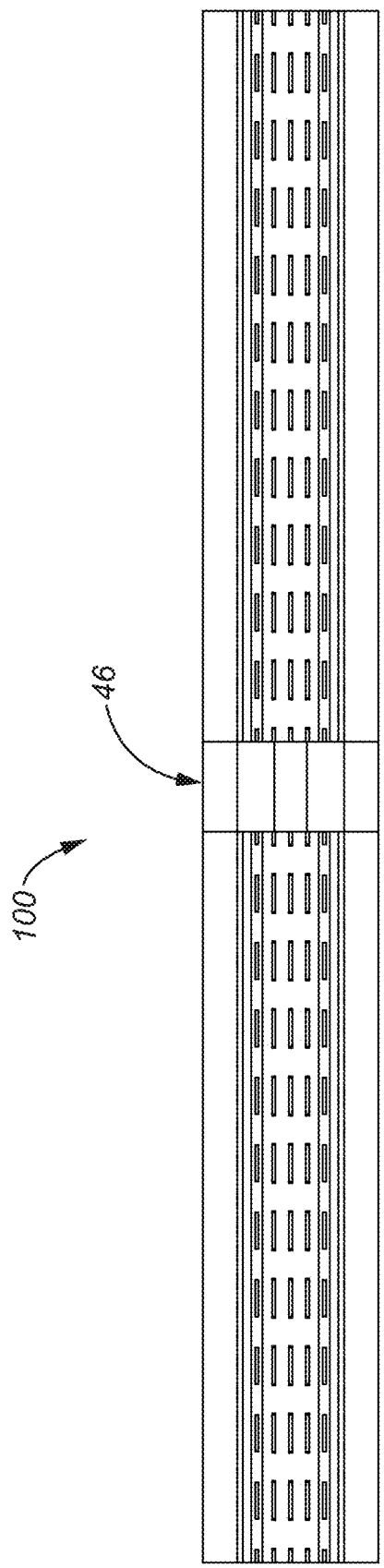
FIG. 20 is a top view of the two welded strips of FIG. 19.
Figure 21:
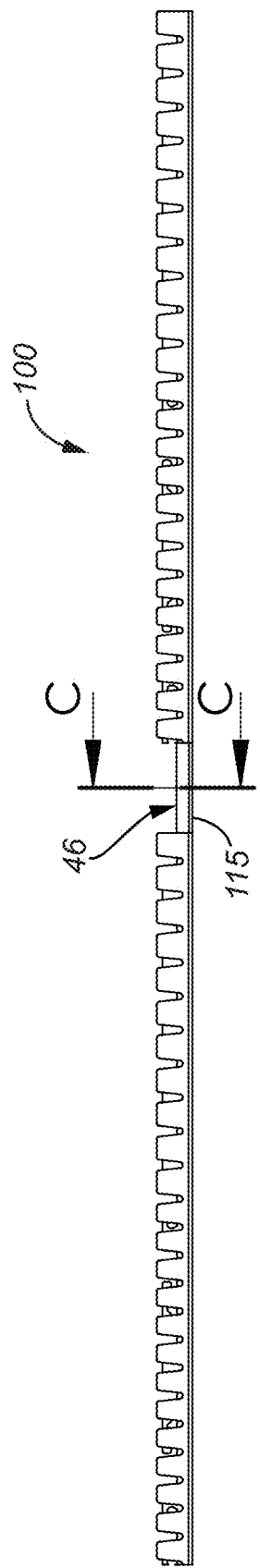
FIG. 21 is a side view of the two welded strips of FIG. 19.

FIGS. 19-23 illustrate a welded tape 100 made up of two tapes 10a, 10b that have been welded together. After the tapes 10a, 10b have been welded together into welded tape 100, the overlay section 36 welds into a welded connection segment 46 along which the two tapes are fused together. As shown in FIGS. 19 and 22, connection segment 46 includes a recessed portion 48 that is recessed relative to non-recessed portions 50 adjacent the recessed portion 48. Recessed portion 48 is formed during the welding process due to the configuration of center section 42 of the extended portion, while non-recessed portions 50 are formed during the welding process due to the configuration of side sections 44. As shown in FIGS. 21-23, the bottom side 115 of the welded tape 100 is generally flat/smooth, even along the connection segment 46.

Figure 24:
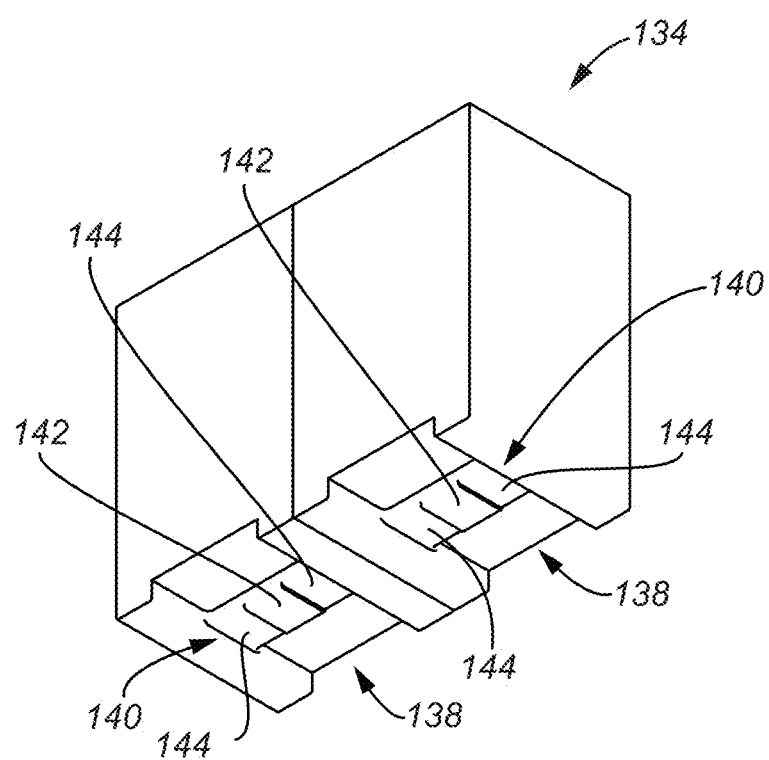
FIG. 24 is a bottom perspective view of a second splicing component according to another embodiment.
Figure 25:
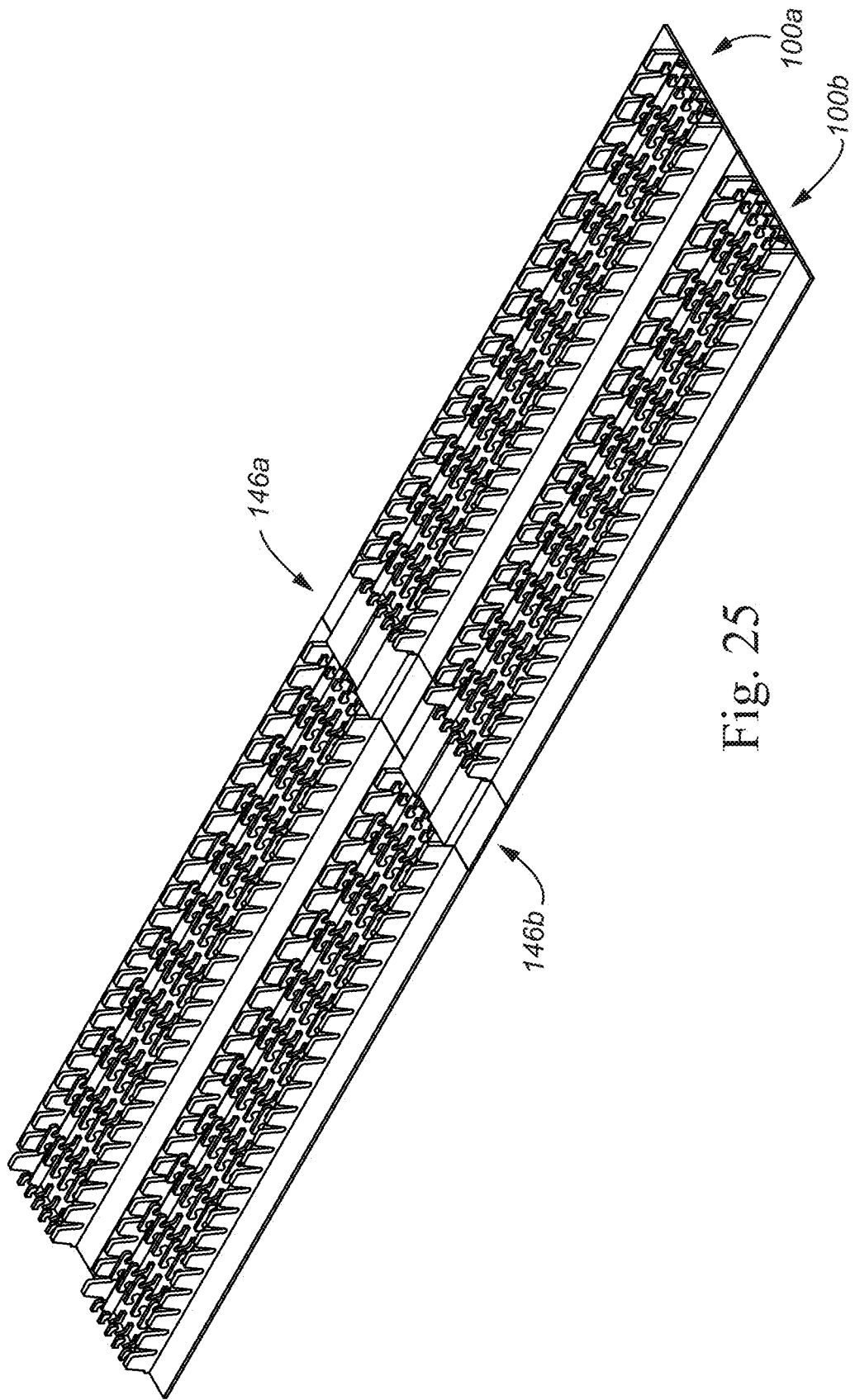
FIG. 25 is a top perspective view showing two rows of welded hook fastener tape.
Figure 26:
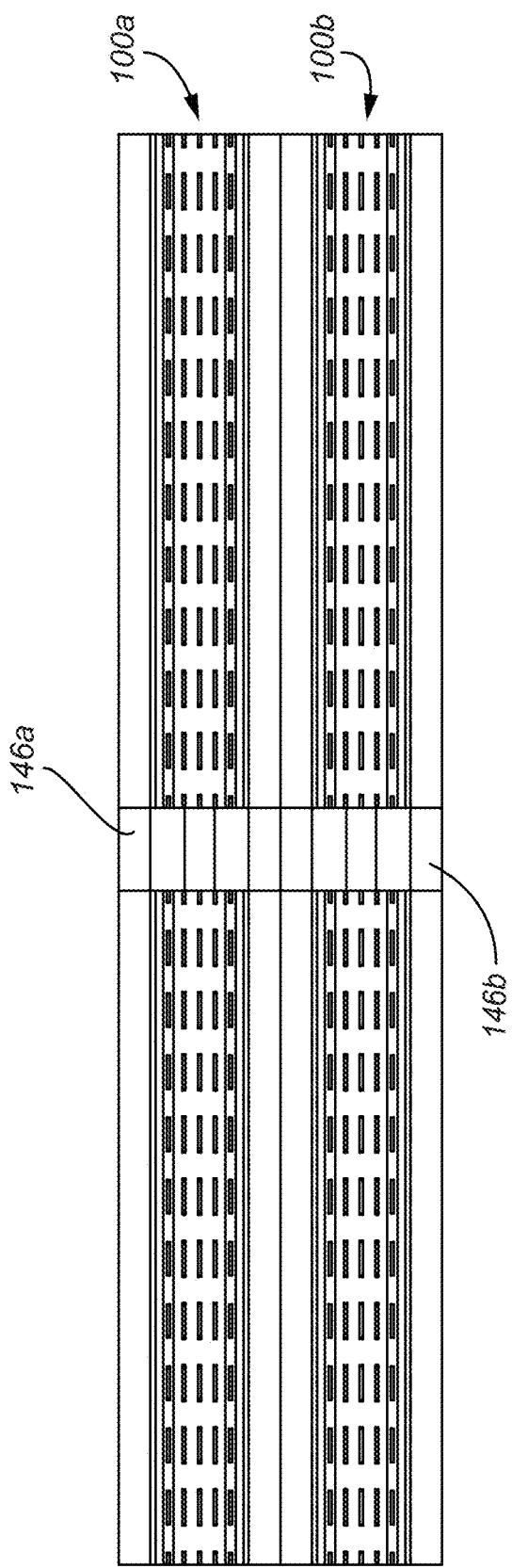
FIG. 26 is a top perspective view of the two rows of welded hook fastener tape of FIG. 25.
Figure 27:
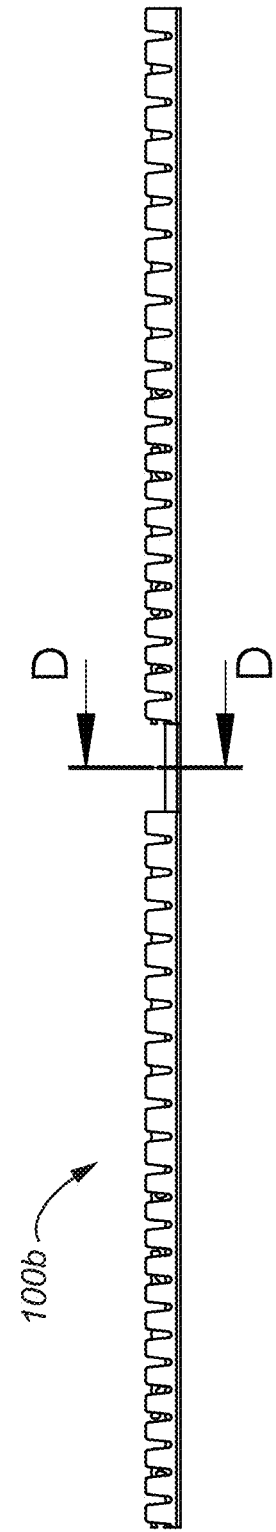
FIG. 27 is a side view of the two rows of welded hook fastener tape of FIG. 25.
Figure 28:
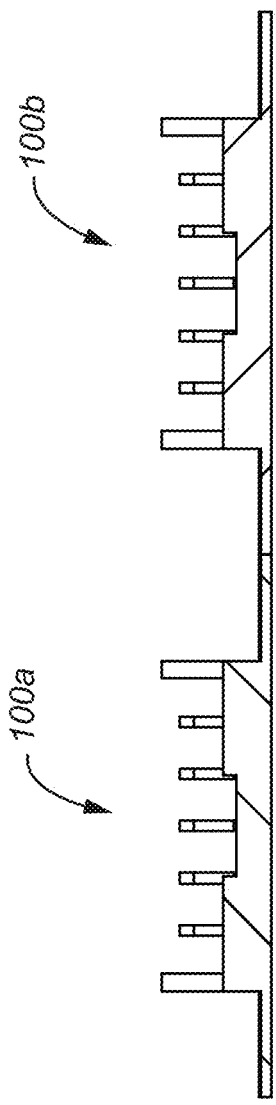
FIG. 28 is a cross-sectional view of the two rows of welded hook fastener tape of FIG. 25, taken along line D-D.
Figure 29:
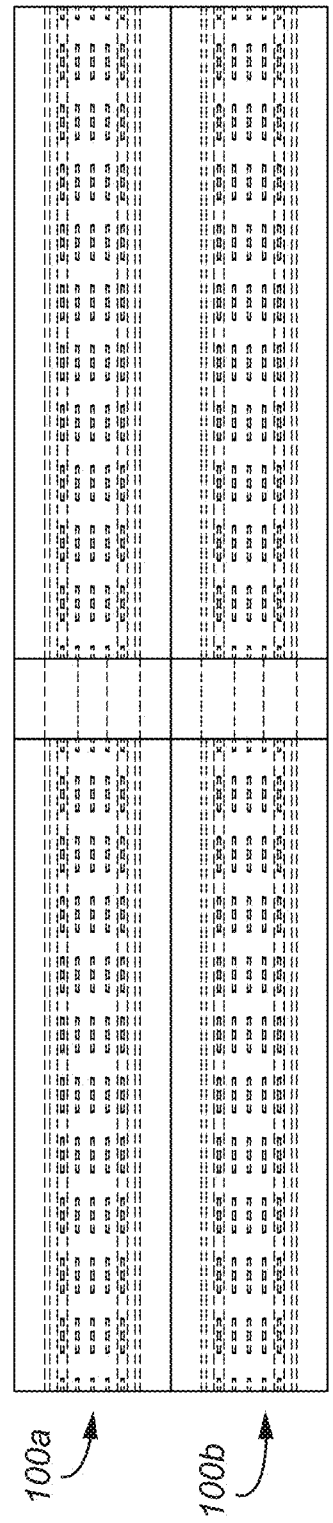
FIG. 29 is a bottom view of the two rows of welded hook fastener tape of FIG. 25.
Figure 30:
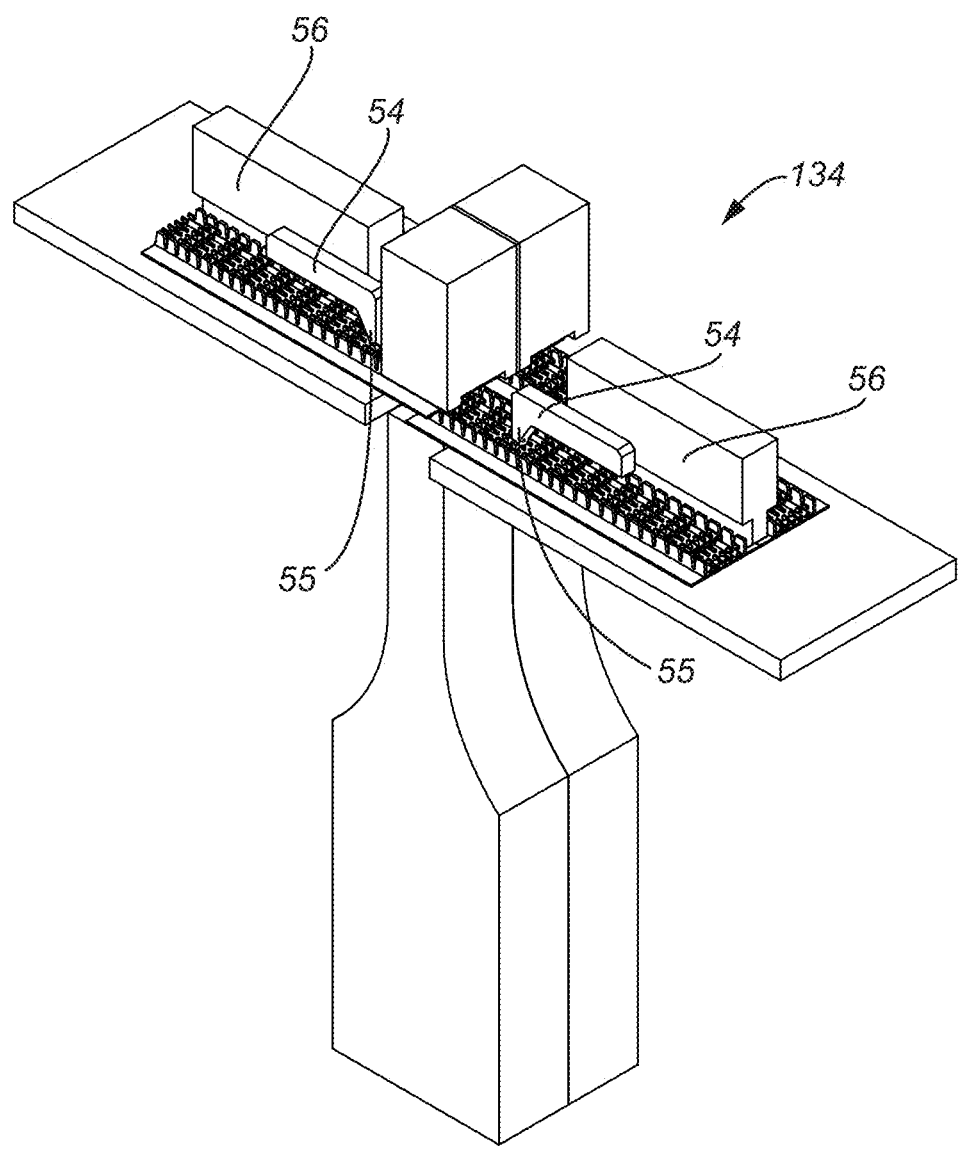
FIG. 30 is a side perspective view of two strips of hook fastener tape positioned between a first splicing component and a second splicing component according to another embodiment.
Figure 31:
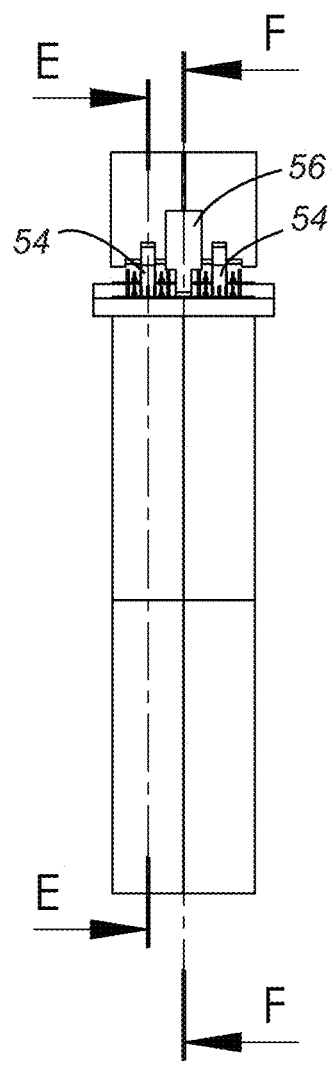
FIG. 31 is an end view of FIG. 30.
Figure 32:
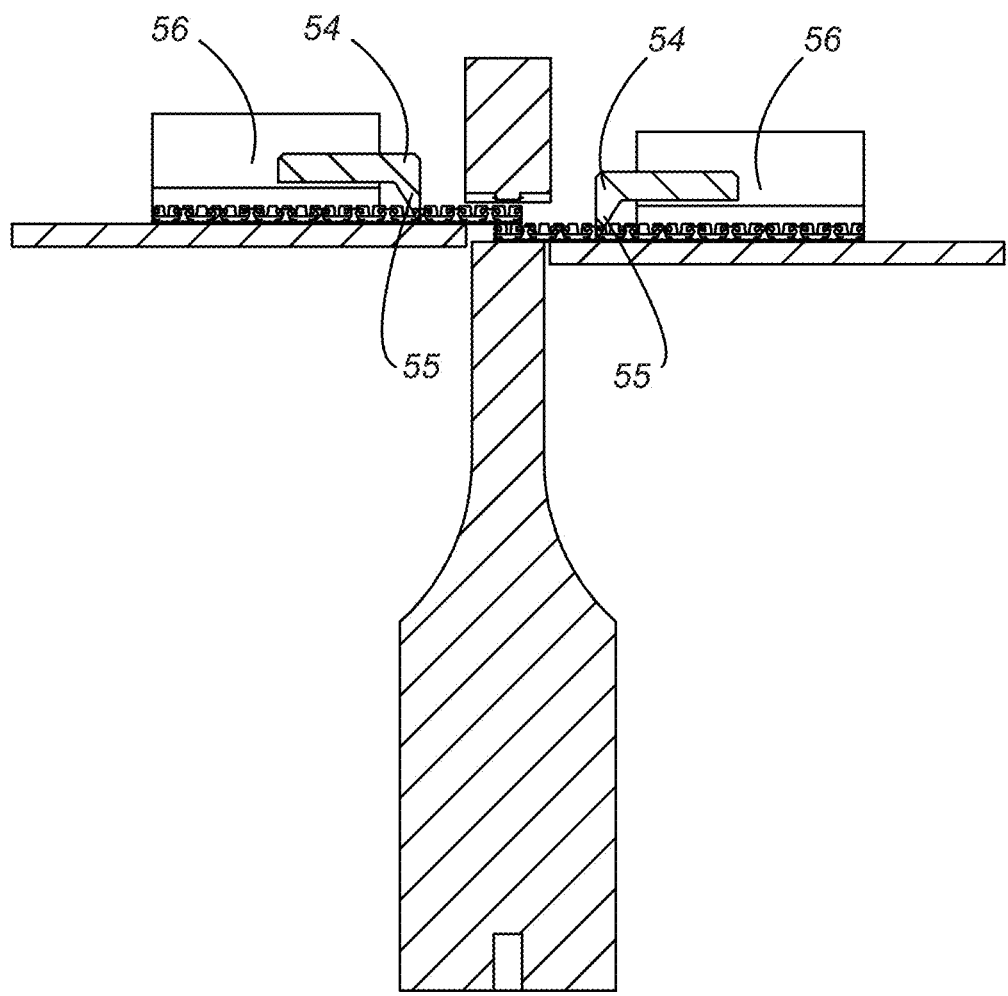
FIG. 32 is a cross-sectional view of FIG. 31, taken along line E-E.
Figure 33:
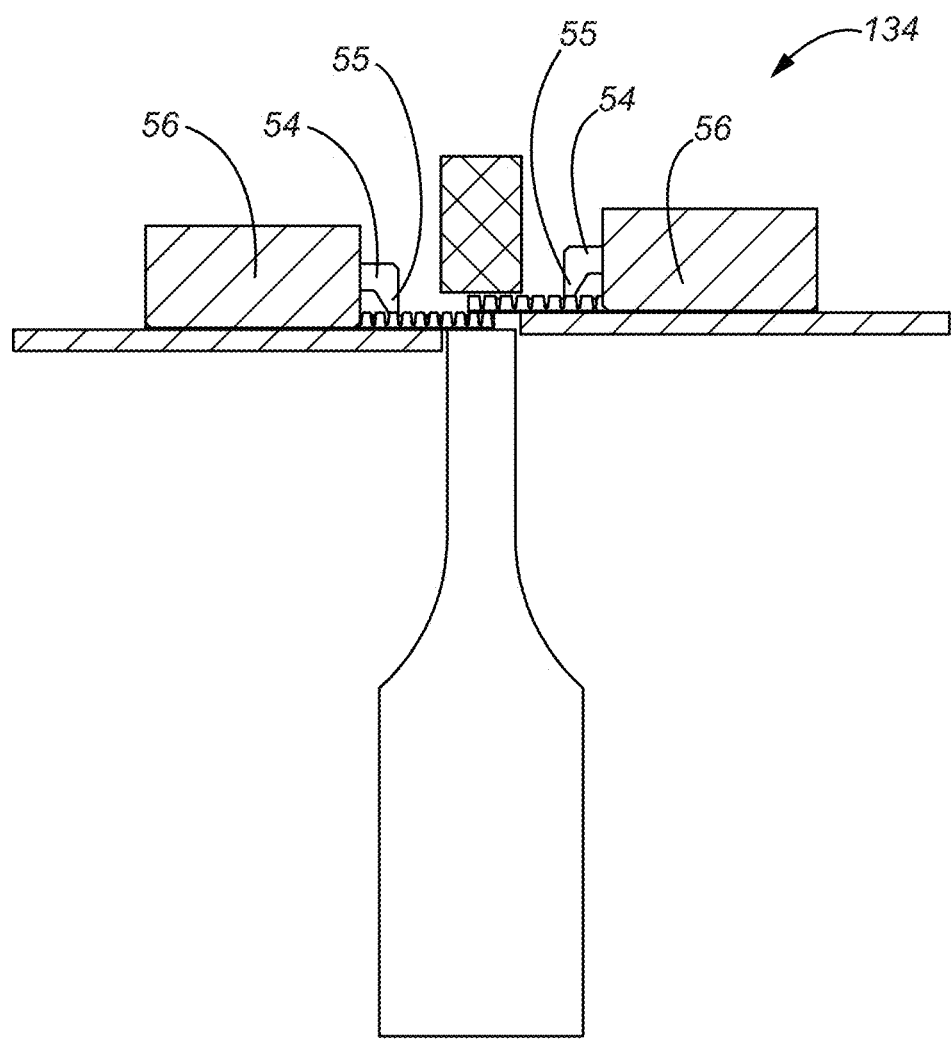
FIG. 33 is a cross-sectional view of FIG. 31, taken along line F-F.

Second splicing component 34 may be configured to receive multiple sets of overlaid tapes simultaneously so that more than one set of overlaid tapes can be welded at or around the same time. FIG. 24, for example, illustrates a second splicing component 134 that is configured to receive two sets of overlaid tapes, although second splicing component 134 may be configured to receive more than two rows of overlaid tapes. More specifically, second splicing component 134 includes two tape receiving channels 138, each of which has an extended portion 140 having a center section 142 that extends relative to two side sections 144 as described above with respect to second splicing component 34. FIGS. 25-29 illustrated two welded tapes 100a, 100b after welding and that result in a welded connection segment 146a, 146b in each. In some embodiments, the two tapes 100a, 100b are joined together via any suitable means.

The hook fastener tapes described herein can be manually or automatically fed/inserted into the tape receiving channel(s) of the second splicing component. As shown in FIGS. 30-33, the ultrasonic joining system may include one or more positioners 54 and/or one or more center guides 56. If used, positioners 54 each have a finger 55 that is configured to engage the tapes in between the rows of hooks 12 to help prevent the tapes from moving forwards or backwards. If used, center guides 56 may be used to help prevent the tapes from moving sideways. The positioners 54 and center guides 56 may be mounted to the table using a shaft or other types of connectors, which are not shown in the figures for simplicity.

Once the tapes are in the proper position relative to the splicing components, at least one of the splicing components oscillates relative to the other splicing component for a suitable amount of time to melt the tapes. Next, the at least one splicing component stops oscillating while the tape is held in position so that the welded connection segment of the two tapes cools and sets. Then, the welded tape may be moved manually or automatically out of the tape receiving channel.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A method of joining two hook fastener tapes comprising:
   providing the two hook fastener tapes, each hook fastener tape comprising a base, a plurality of hooks extending from the base, and a wall extending from the base along a side of the hook fastener tape;
   providing a first splicing component;
   providing a second splicing component comprising a tape receiving channel with an extended portion, the extended portion comprising a center section between two side sections, wherein the center section projects beyond the two side sections;
   positioning the two hook fastener tapes relative to the first and second splicing components such that an overlay section of the two hook fastener tapes aligns with the extended portion;
   positioning the overlay section relative to the tape receiving channel such that hooks of the overlay section generally align with the center section of the extended portion and such that the wall of the overly section generally aligns with each side section of the extended portion; and
   splicing the two hook fastener tapes at the overlay section using ultrasonic welding to form a welded tape with a welded connection segment that corresponds to the overlay section.

2. The method of claim 1, further comprising oscillating at least one of the first splicing component and the second splicing component to splice the two hook fastener tapes.

3. The method of claim 1, further comprising oscillating at least one of the first splicing component and the second splicing component such that the welded connection segment comprises a recessed portion between two non-recessed portions, wherein the recessed portion is recessed relative to the two non-recessed portions.

4. The method of claim 1, wherein the positioning the two hook fastener tapes relative to the first and second splicing components comprises positioning the two hook fastener tapes so that:
   a top surface of each of the two hook fastener tapes faces the second splicing component, wherein a plurality of hooks project from the top surface; and
   a generally flat bottom surface of each of the two hook fastener tapes faces the first splicing component.

5. The method of claim 4, further comprising using at least one positioner to guide the two hook fastener tapes within the tape receiving channel.

6. A method of splicing two strips of hook fastener tape using ultrasonic welding, the ultrasonic welding comprising:

providing the two hook fastener tapes, each hook fastener tape comprising a base, a plurality of hooks extending from the base, and a wall extending from the base along a side of the hook fastener tape;

positioning the two strips of hook fastener tape between a first splicing component and a second splicing component, the second splicing component comprising a tape receiving channel with an extended portion, the extended portion comprising a center section between two side sections, wherein the center section projects beyond the two side sections;

positioning an overlay section of the two hook fastener tapes relative to the tape receiving channel such that the hooks of the overlay section of the two strips generally align with the center section of the extended portion and such that the wall of the overlay section generally aligns with each side section of the extended portion; and oscillating the first splicing component relative to the second splicing component.

7. The method of claim 6, wherein the positioning of the two strips of hook fastener tape between the first splicing component and the second splicing component comprises positioning the two strips of hook fastener tape within the tape receiving channel.

8. The method of claim 7, wherein the positioning the two strips of hook fastener tape within the tape receiving channel comprises positioning the two strips of hook fastener tape such that the two strips of hook fastener tape overlap along the overlay section.

9. The method of claim 6, wherein the positioning the two hook fastener tapes between the first and second splicing components comprises positioning the two hook fastener tapes so that:

a top surface of each of the two hook fastener tapes faces the second splicing component, wherein a plurality of hooks project from the top surface; and a generally flat bottom surface of each of the two hook fastener tapes faces a generally flat surface of the first splicing component.

10. The method of claim 7, further comprising using at least one positioner to help guide the two hook fastener tapes within the tape receiving channel.

* * * * *

UNITED STATES PATENT AND TRADEMARK OFFICE
CERTIFICATE OF CORRECTION

Page 1 of 1

PATENT NO. : 10,405,615 B2
APPLICATION NO. : 15/663307
DATED : September 10, 2019
INVENTOR(S) : Kazuhiro Nozaka et al.

It is certified that error appears in the above-identified patent and that said Letters Patent is hereby corrected as shown below:

On the Title Page

In item (72), in Column 1, in "Inventor", Line 6, delete "Robbins," and insert -- Robins, --, therefor.

In item (72), in Column 1, in "Inventor", Line 7, delete "Robbins," and insert -- Robins, --, therefor.

Signed and Sealed this
Tenth Day of December, 2019

Andrei Iancu
*Director of the United States Patent and Trademark Office*